(12) United States Patent
Gavin

(10) Patent No.: US 6,450,505 B1
(45) Date of Patent: Sep. 17, 2002

(54) SEAL FOR CASTING IN A CONCRETE WALL OF A FLUID DISTRIBUTION SYSTEM CONTAINER

(76) Inventor: Norman W. Gavin, 2545 Ridge Rd., North Haven, CT (US) 06473

( * ) Notice: Subject to any disclaimer, the term of this patent is extended or adjusted under 35 U.S.C. 154(b) by 0 days.

(21) Appl. No.: 09/358,964

(22) Filed: Jul. 22, 1999

Related U.S. Application Data

(60) Provisional application No. 60/112,700, filed on Dec. 18, 1998.

(51) Int. Cl.[7] .............................. F16L 5/02; F16L 17/06; E02B 11/00; E04G 15/00
(52) U.S. Cl. ................... 277/606; 277/609; 277/607; 277/616; 405/43; 249/39
(58) Field of Search .................. 277/606, 607, 277/608, 609, 615, 616, 626, 917, 603; 405/43, 46, 47; 249/39

(56) References Cited

U.S. PATENT DOCUMENTS

| | | | |
|---|---|---|---|
| 2,635,907 A | * | 4/1953 | Heimbuch |
| 2,924,472 A | * | 2/1960 | Bush |
| 3,727,876 A | | 4/1973 | Keyser |
| 3,758,066 A | | 9/1973 | Skinner et al. |
| 3,796,406 A | | 3/1974 | Ditcher |
| 3,815,214 A | | 6/1974 | Kyle, Sr. |
| 4,213,619 A | * | 7/1980 | Arit et al. |
| 4,645,177 A | * | 2/1987 | Moakes |
| 4,650,149 A | | 3/1987 | Poulette et al. |
| 4,703,136 A | * | 10/1987 | Hauff |
| 4,732,397 A | * | 3/1988 | Gavin |
| 4,854,543 A | | 8/1989 | Diagle et al. |
| 4,951,914 A | * | 8/1990 | Meyers et al. |
| 5,286,040 A | | 2/1994 | Gavin |
| 5,711,536 A | * | 1/1998 | Meyers |
| 5,941,535 A | * | 8/1999 | Richard |
| 6,168,168 B1 | * | 1/2001 | Brown |

FOREIGN PATENT DOCUMENTS

| | | |
|---|---|---|
| CA | 1191362 | 8/1985 |
| SU | 1831553 | 7/1993 |

* cited by examiner

Primary Examiner—Anthony Knight
Assistant Examiner—Vishal Patel
(74) Attorney, Agent, or Firm—Robert A. Seemann

(57) ABSTRACT

In molding a seal in a concrete wall, the front end of a tubular element is inserted between an outer tubular wall which forms part of the opening in the concrete wall and a conical seal that is integrally molded with the outer tubular wall. The tubular element includes a foot having a fastener portion that is spaced from and coplanar with the back end of the tubular element.

9 Claims, 8 Drawing Sheets

SEAL FOR CASTING IN A CONCRETE WALL OF A FLUID DISTRIBUTION SYSTEM CONTAINER

This application claims the benefit of U.S. Provisional Application No. 60/112,700, filed Dec. 18, 1998.

BACKGROUND OF THE INVENTION

1. Field of the Invention:

The invention pertains to seals, more specifically to a seal for casting in a concrete wall of a container of a septic system fluid distribution system, that forms an opening through the concrete wall that is closed by the seal.

2. Description of the Prior Art

U.S. Pat. No. 5,286,040 patented Feb. 15, 1994 by N. W. Gavin describes a unitary molded seal comprising a cylindrical outer wall and a cup-shaped seal attached to a first end of the cylindrical wall at the open end of the cup. The seal is held in the mold for a wall of a concrete container by a cup-shaped protrusion that extends from a first wall of the mold into the open end of the cup. The first wall contacts the first end of the cylindrical wall, and a second wall of the mold contacts the second end of the cylindrical outer wall so that the cylindrical wall forms the opening in the hardened concrete wall and lines the full length of the opening.

When the cylindrical wall is shorter than the distance between the first and second walls of the mold, a concrete flash covers part or all of the opening adjacent to the bottom of the cup.

A ring extends radially from the cylindrical outer wall. The ring anchors the cylindrical wall in the concrete wall against axial thrust of pipe when pipe is inserted through an opening in the bottom of the cup which is made by tearing out a portion of the bottom sealing wall of the cup.

U.S. Pat. No. 3,815,214 patented Jun. 11, 1974 by Kyle, Sr. describes a pair of frustoconical shells supporting an annular resilient O-ring on an annular groove that is semi-circular in cross section. The O-ring supporting groove is formed by quarter-circle in cross section annular grooves, one on one end of each shell which abut to form the semicircular groove when the two frustoconical shells are drawn together by a bolt which passes through the outer wall of the concrete form, through one shell, and screws into the other shell. The mold outer wall, pair of shells, and mold inner wall form a hole through the concrete wall when the wall is molded. When the shells are withdrawn from the molded wall, the inner wall of the hole mirrors the shape of the joined shells and contains the O-ring the outer circumference of which is embedded in an annular groove, half-circle in cross section, in the concrete.

U.S. Pat. No. 4,650,149 patented Mar. 17, 1987 by Poulette et al. describes a metal cylinder extending to an inside wall and an outside wall of a form for a concrete wall. The metal cylinder is surrounded by a flexible rubber or elastomeric sleeve that extends to the inside wall and the outside wall. A narrow gasket surrounds the sleeve. The inner diameter of the gasket comprises an annular ring, arrowhead in cross section, that is embedded in an annular groove around the sleeve. The outer diameter of the gasket is T-shaped in cross section, for being molded into the concrete as an annular anchor for the gasket. After the concrete is poured between the inside and outside walls of the form, and sets, bolts holding the metal cylinder between the walls are removed, the form walls are removed, the metal cylinder is removed, and the rubber sleeve is pulled radially inward off the annular ring and is withdrawn from the hole through the concrete wall made by the sleeve on the cylinder.

SUMMARY OF THE INVENTION

It is one object of the invention to provide a seal for casting in a concrete wall comprising a first tubular outer wall element molded with one end of a cup shaped element designed for receiving pipe through the bottom of the cup, and a second, independent tubular element inserted between the first tubular outer wall element and an outer wall of the cup shaped element.

It is another object of the invention to provide a seal for casting in a concrete wall comprising a first tubular element having a first open end and a second sealing end adapted for sealing around pipe, the first end being molded with a first end of a second tubular element, the second sealing end extending into the second tubular element, and a third tubular element extending between the first tubular element and the second tubular element. Preferably the third tubular element is made of a stiffer material than the integrally molded first and second tubular elements. Preferably the third tubular element is removably inserted between the first and second tubular elements.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Figure 1:
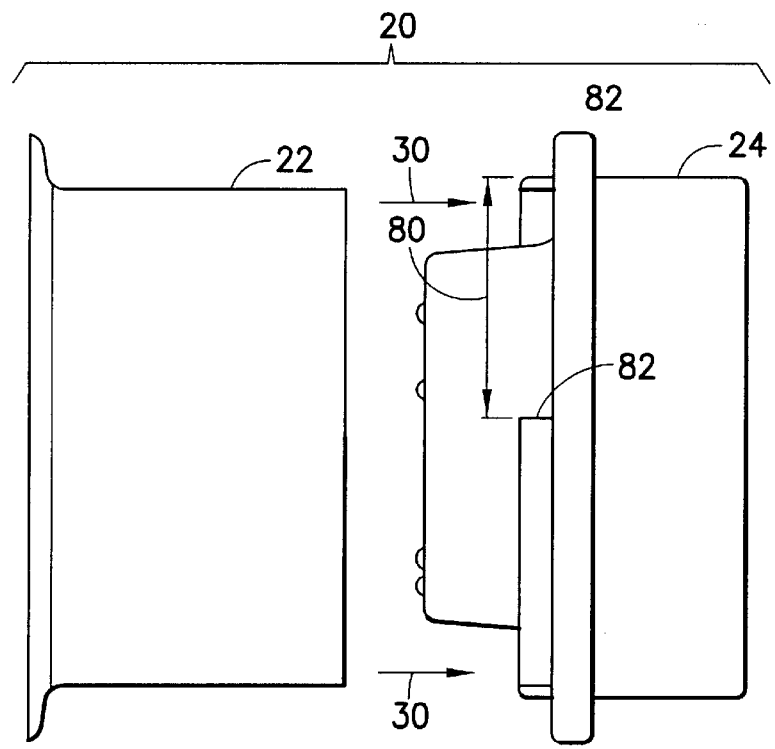
FIG. 1 is a side view of a seal of the invention.
Figure 2:
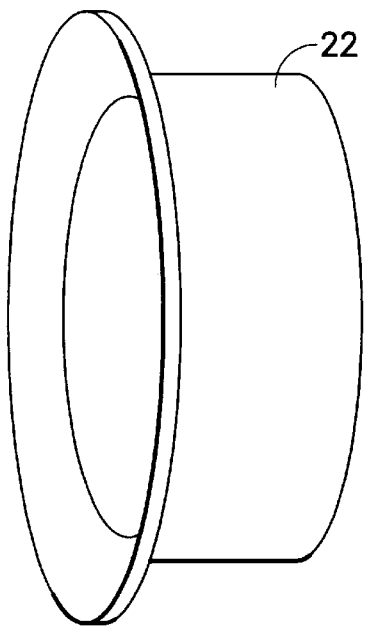
FIG. 2 is a perspective view of a hollow cylindrical portion of the seal of FIG. 1.
Figure 3:
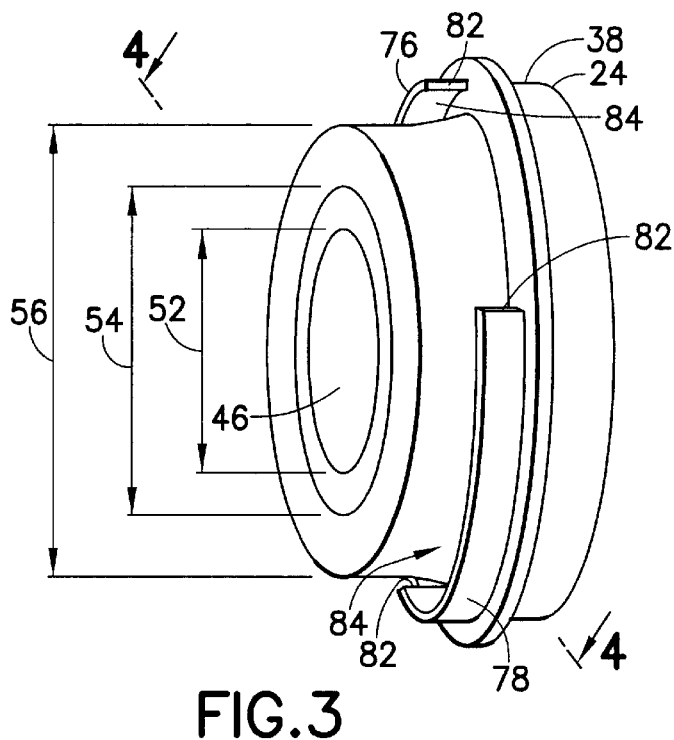
FIG. 3 is a perspective view of a diaphragm seal portion of the seal of FIG. 1.
Figure 4:
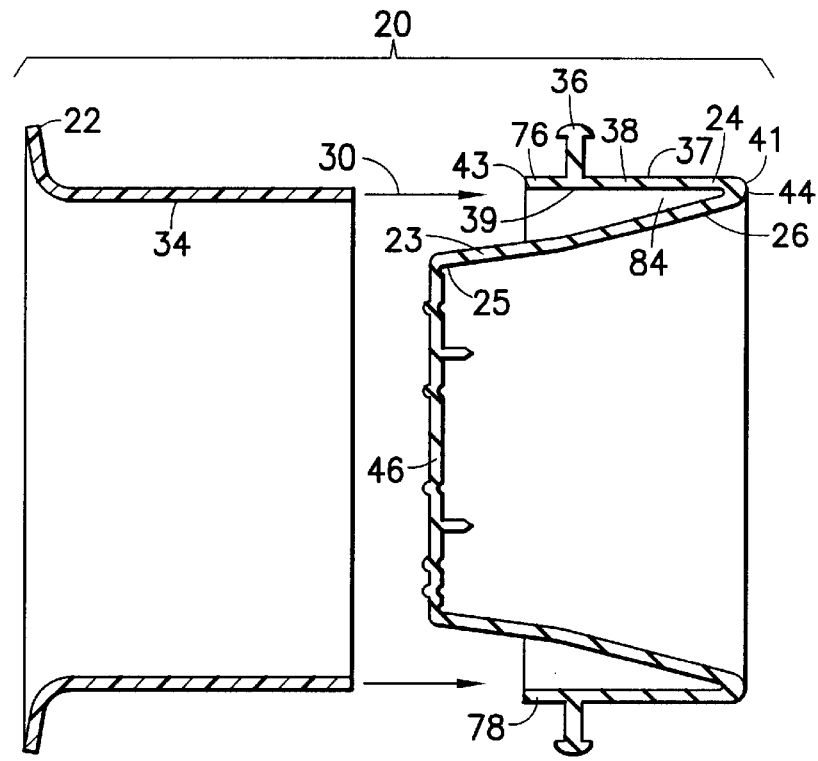
FIG. 4 is a schematic cross section view of the seal of FIG. 1 taken along 4—4 shown in FIG. 3.
Figure 5:
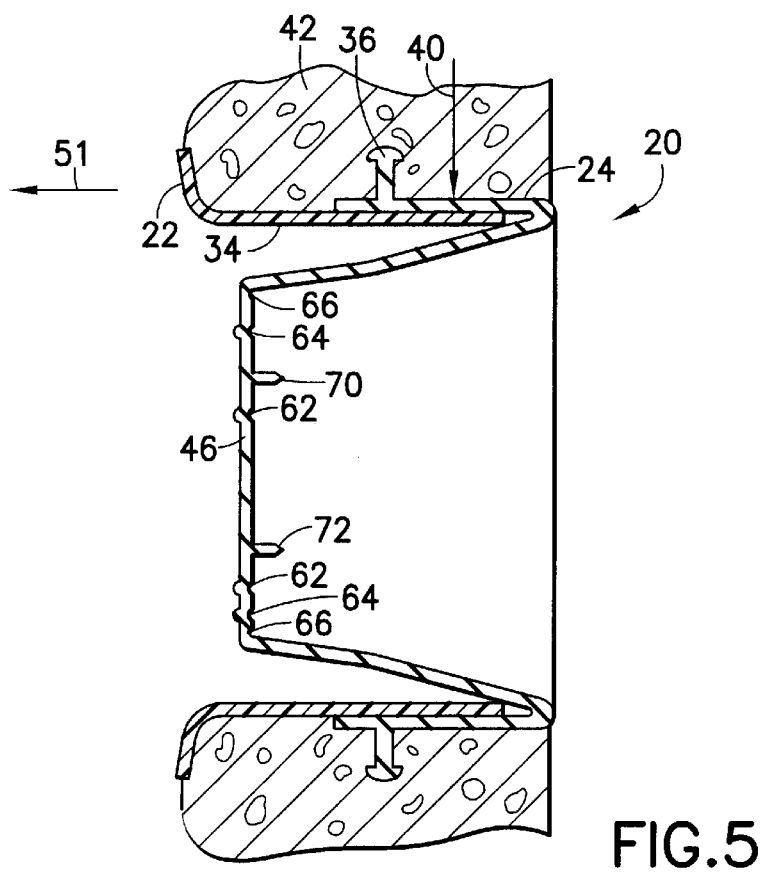
FIG. 5 is a schematic cross section view of the seal of FIG. 1 in a concrete wall.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Referring to FIGS. 1–5, hollow cylindrical portion 22 of two-part seal 20 is preferably made of a stiff plastic or other stiff material. Diaphragm portion 24 is preferably made of rubber or other elastic material suitable for making a tight seal around a pipe, and preferably molded in one piece.

Front end 26 of frustoconical or angled wiper blade 23 is attached to front end 41 of wall 38 at front end 44 of portion 24 of seal 20. Wiper blade 23 extends radially inward of cylindrical wall 38 and inwardly from the attachment of front end 26.

During installation in a mold (not shown) for a concrete wall, portion 22 is inserted 30 into portion 24. Cylindrical wall 34 radially inward of inner surface 39 of wall 38 supports cylindrical wall 38 against the inward crushing force 40 of the liquid concrete 42. After the concrete hardens, portion 22 may be removed 51 from the concrete wall.

Radially extending anchor flange 36 on outer surface 37 of wall 38 anchors portion 24 in the cement.

Cylindrical wall 38 has front end 41 and-back end 43.

Seal diaphragm 46 attached to back end 25 of angled wiper blade 23 may be torn out in selected diameters 52, 54, 56 by tearing along weakened annular lines 62, 64, 66 respectively.

Guide pins 70, 72 position portion 24 in the mold.

Curved walls 76, 78, guide wall 34 of portion 22 into annular slot 84 between cylindrical wall 38 and angled wiper blade 23. Walls 34, 38, and 23 may be tubular, including not circular in cross section and not constant in diameter.

Curved walls 76, 78 preferably have annularly spaced 80 sides 82 to receive a different hollow cylindrical portion which will be discussed later.

If annular spaces are not desired for the purpose described later, a continuous wall may be used instead of the two curved walls.

Figure 6:
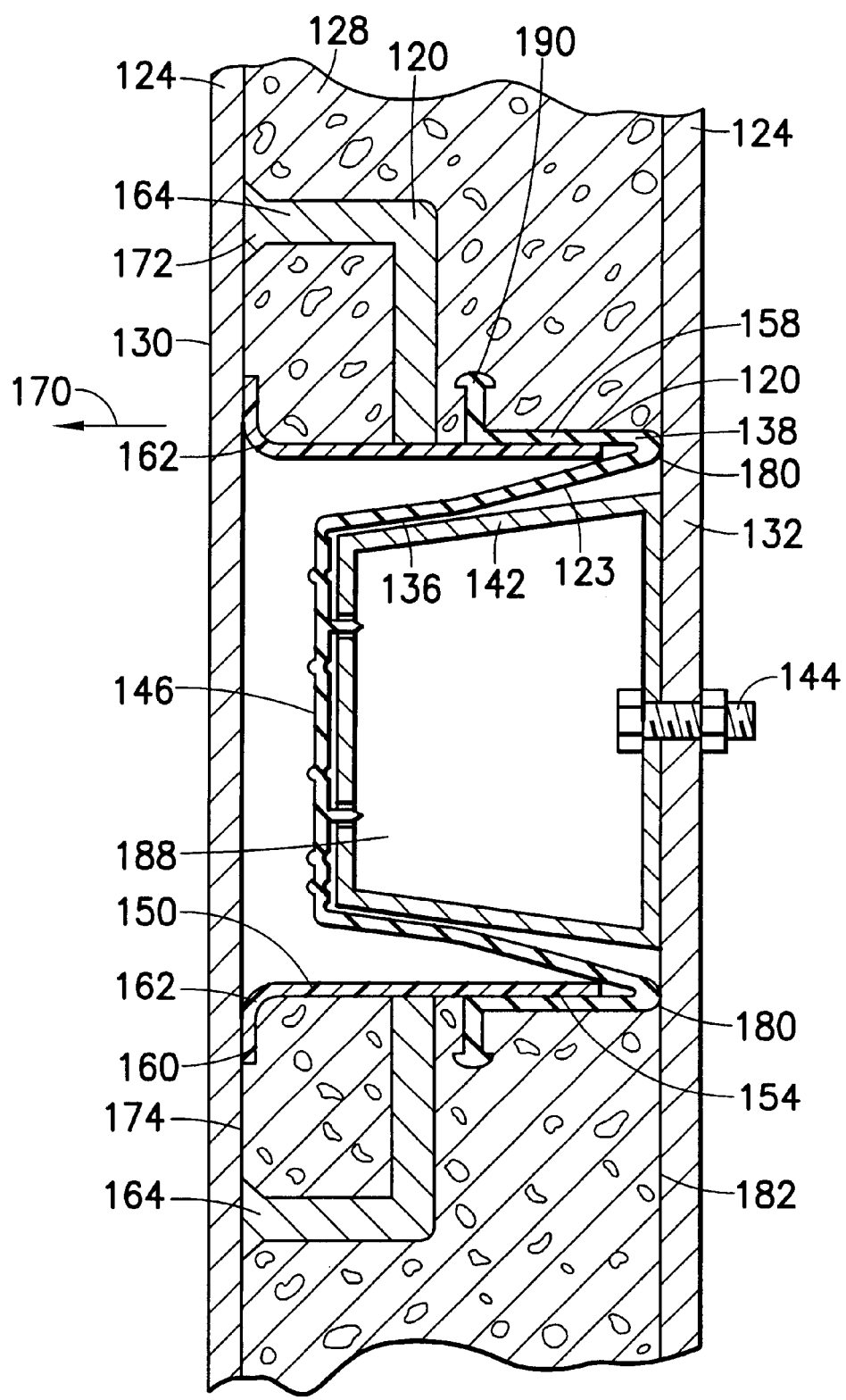
FIG. 6 is a schematic cross section view of another seal of the invention in a portion of a concrete wall casting form for a septic tank.
Figure 7:
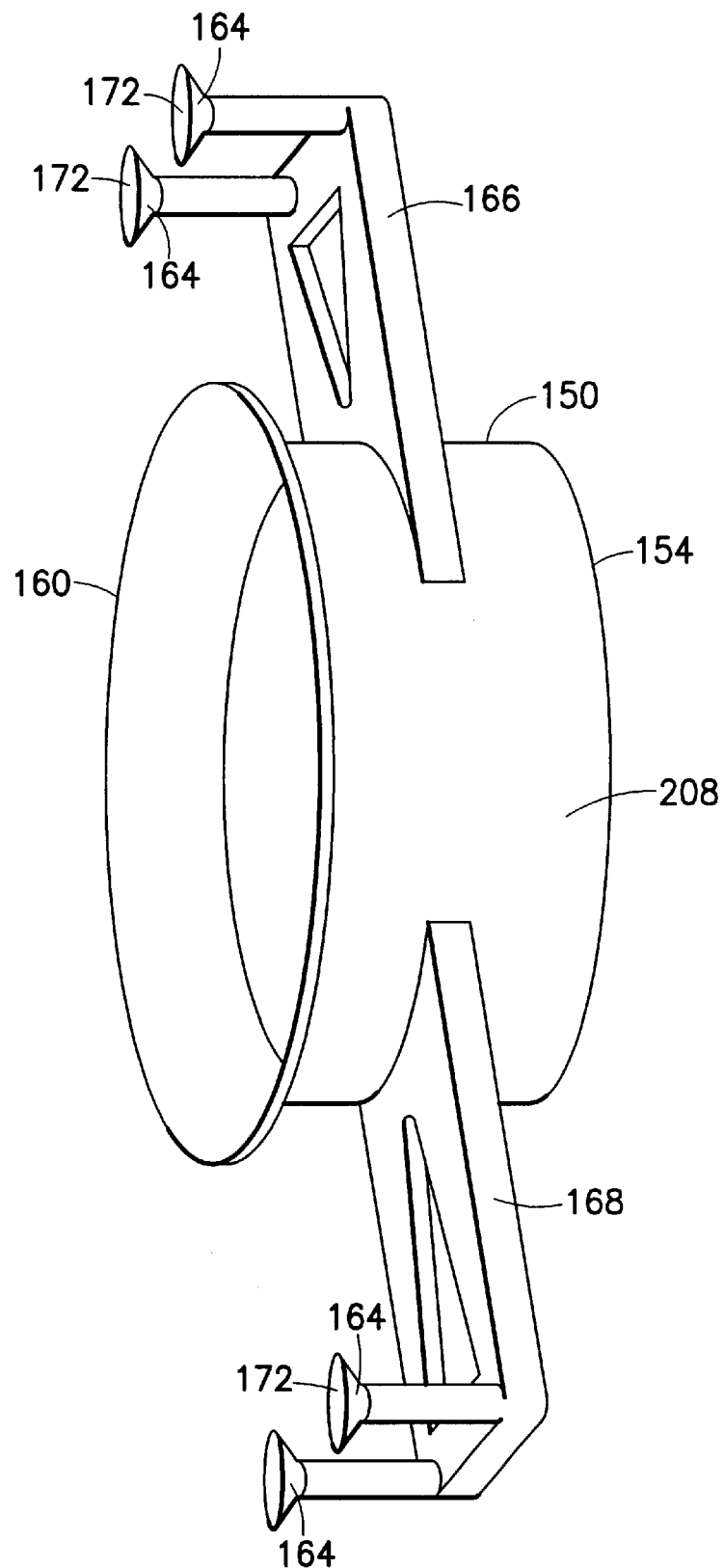
FIG. 7 is a perspective view of a hollow cylindrical portion of the seal of FIG. 6.
Figure 8:
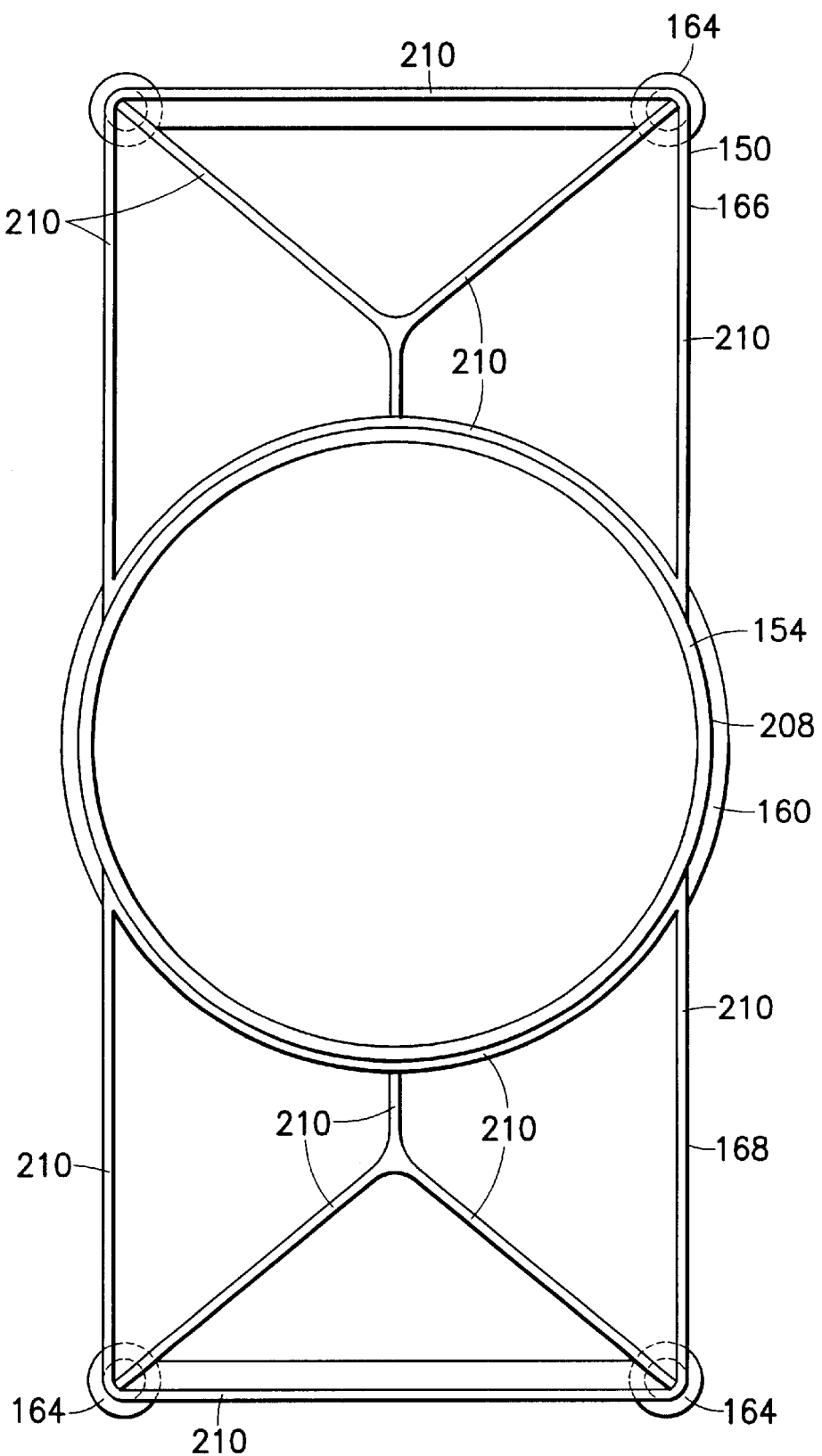
FIG. 8 is a schematic front view of the seal portion of FIG. 7.
Figure 9:
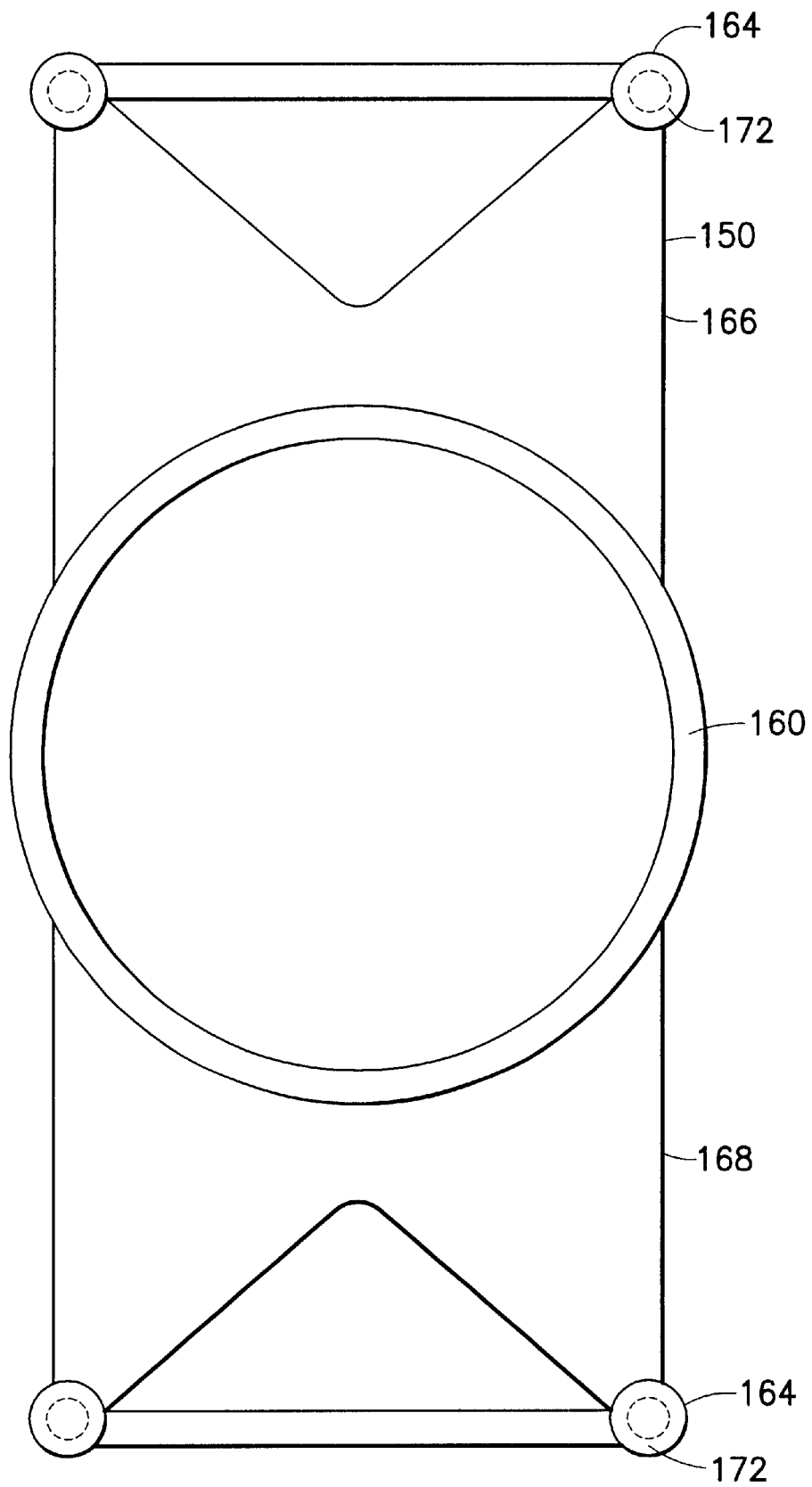
FIG. 9 is a schematic back view of the seal portion of FIG. 7.

Referring to FIGS. 6–11 for illustration of elements, in FIG. 6, two-part seal 120 is mounted between form inner wall 130 and form outer wall 132 of mold 124 for concrete wall 128 of septic tank 134.

Cup-shaped cavity 136 that is formed by seal diaphragm 146 and angled wiper blade 123 of diaphragm portion 138 of seal 120 fits over support cup 142 that is bolted 144 to outer wall 132 of the form.

Front end 154 of hollow cylindrical portion 150 is inserted between cylindrical wall 158 and angled wiper blade 123. Back end 160 of hollow cylindrical portion 150 is in contact with form inner wall 130. Back end 160 preferably curves radially outward 162.

Fastener feet 164 of brackets 166, 168 contact form inner wall 130. Concrete is poured between walls 130, 132.

When the concrete is set walls 130, 132, and support cap 142 are separated and removed. Concrete wall 128 is formed with brackets 166, 168 enclosed by the concrete. Rearward 170 facing end 172 of fastener feet 164 are coplanar with inner face 174 of wall 128. Back end 160 of hollow cylindrical portion 150 is coplanar with inner face 174. Front end 180 of diaphragm portion 138 is coplanar with outer face 182 of concrete wall 128. This leaves an opening 188 through wall 128 that is sealed watertight by seal 120. The seal can be broken by tearing out a portion of seal diaphragm 222. The remaining portion of the seal diaphragm, or the angled wiper blade, depending upon how much seal material is removed, seals around pipe that is forced through the torn seal.

Figure 10:
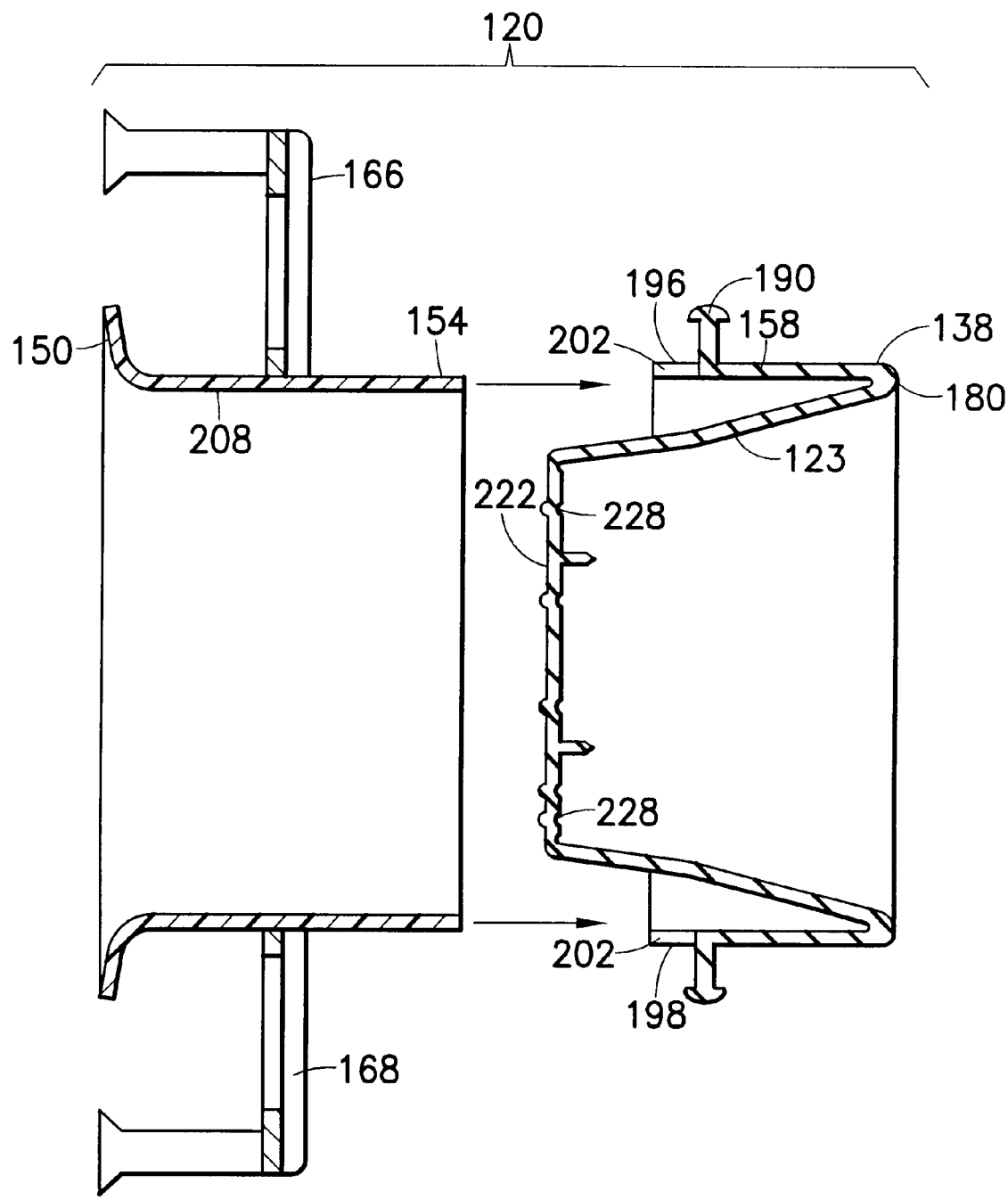
FIG. 10 is a schematic cross section view of the seal of FIG. 6 before it is installed in the concrete wall casting form.

In FIG. 10, cylindrical portion 150 front end 154 is inserted between cylindrical wall 158 and angled wiper blade 123 when seal 120 is installed between walls 130, 132.

Preferably, cylindrical portion 150 is inserted until brackets 166, 168 are adjacent to radially extending anchor flange 190. For this, opposed curved walls 196 and 198 of diaphragm portion 138 are like curved walls 76 and 78 of seal 20 which have annularly spaced 80 ends 82. Brackets 166, 168 can be moved into adjacentcy with anchor 190 by passing them between annularly spaced sides 202 of walls 196, 198.

Brackets 166, 168 are alike. Ribs 210 strengthen the brackets. The brackets are preferably molded in one piece with cylindrical wall 208, but may be attached to the wall by fastening means comprising welding, pins, adhesive or other means. Feet 164 are tubular, adapted for receiving fastener means from a fluid flow diverter shield.

Figure 11:
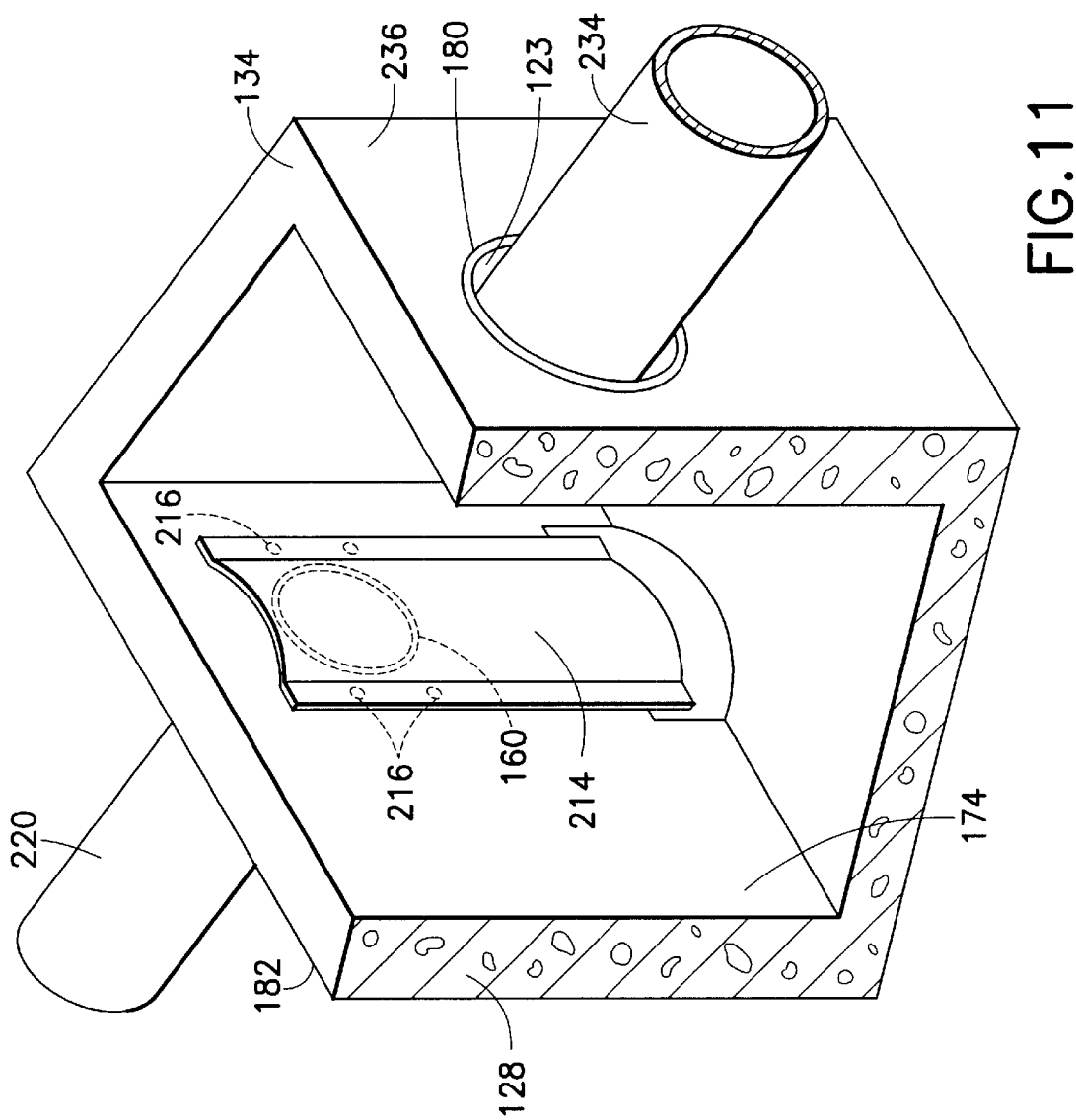
FIG. 11 is a perspective view of a septic tank containing the seal of FIG. 6 supporting a plastic liquid flow baffle in the tank.

In FIG. 11, fluid flow diverter shield 214 is attached to inner face 174 of wall 128 by fasteners 216 which extend into ends 172, not shown, of the feet. Ends 172 are adapted to fasten with fasteners 216. Preferably ends 172 comprise tubular openings that grip the fasteners. Other accessories can be attached to the wall by fasteners fastening to the feet, including a filter.

Pipe 220 extends through seal diaphragm 222, torn away at annular groove 228. Septic tank 134 is designed to receive effluent by way of pipe 220.

Pipe 234 passes through another seal 120 in wall 236.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A seal for casting in a concrete wall, said seal comprising:

a first tubular element having a first end, and a second end of diameter smaller than the diameter of the first end, the second end comprising means for sealing to a pipe, a second tubular element comprising a radially extending anchor for casting into the concrete wall, extending in a first axial direction from said anchor to a first end of said second tubular element integrally molded with the first end of said first tubular element which extends into said second tubular element axially opposite to the first axial direction, a third tubular element having a first end and a second end, the first end of said third tubular element extending axially between said first tubular element and said second tubular element, a plurality of arms, integrally molded with said third tubular element, extending radially from said third tubular element, each arm comprising means for fastening that is coplanar with, and radially spaced from the second end of said third tubular element so that said means for fastening is cast permanently into said concrete wall adjacent to a surface of the concrete wall, wherein the second end of said third tubular element curves radially outward.

2. The seal of claim 1 wherein said third tubular element is made of a stiffer material than the integrally molded first and second tubular elements.

3. The seal of claim 1 wherein said third tubular element is removably inserted between the first and second tubular elements.

4. The seal of claim 1 wherein the radially outward curve extends axially beyond the first tubular element and the second tubular element.

5. The seal of claim 1, further comprising:

a diaphragm integrally molded with said first tubular element, sealing the second end of said first tubular element.

6. The seal of claim 5, further comprising:

said diaphragm comprising a weakened annular line for removing a portion of said diaphragm by separating along said weakened annular line.

7. A seal for casting in a concrete wall between a first form wall, said seal comprising;

a first tubular element having a first end, and a second end of diameter smaller than the diameter of the first end, adapted for sealing to a pipe;

a second tubular element comprising a radially extending anchor for casting into the concrete wall, extending in a first axial direction from said anchor to a first end of said second tubular element integrally molded with the first end of said first tubular element which extends into said second tubular element axially opposite to the first axial direction, a third tubular element having a first end and a second end, the first end of said third tubular element extending between said first tubular element and said second tubular element, a plurality of radially extending arms mounted on said third tubular element, each arm comprising means for fastening that is coplanar with, and radially spaced from the second end of said third tubular element so that said means for fastening is cast permanently into said concrete wall adjacent to a surface of the concrete wall, the second end of said third tubular element curves radially outward.

8. The seal of claim 7, further comprising:

a diaphragm integrally molded with said first tubular element, sealing the second end of said first tubular element.

9. The seal of claim 8, further comprising:

said diaphragm comprising a weakened annular line for removing a portion of said diaphragm by separating along said weakened annular line.

\* \* \* \* \*